United States Patent
Klimenko (10) Patent No.: US 7,261,607 B1
(45) Date of Patent: Aug. 28, 2007

(54) HOVERING INFLATABLE TOWABLE WATER-SPORT DEVICE

(75) Inventor: Konstantin Klimenko, Santa Monica, CA (US)

(73) Assignee: Sevylor, Inc., Los Alamitos, CA (US)

( * ) Notice: Subject to any disclaimer, the term of this patent is extended or adjusted under 35 U.S.C. 154(b) by 0 days.

(21) Appl. No.: 11/229,252

(22) Filed: Sep. 16, 2005

(51) Int. Cl.
*B63B 1/00* (2006.01)
*B63B 21/04* (2006.01)

(52) U.S. Cl. .......................... 441/65; 114/253
(58) Field of Classification Search ............ 441/65–67, 441/74, 78, 136; 114/242, 253
See application file for complete search history.

(56) References Cited

U.S. PATENT DOCUMENTS

| | | | | |
|---|---|---|---|---|
| 3,380,090 A | * | 4/1968 | Kenmuir | 114/357 |
| 4,807,554 A | * | 2/1989 | Chi-Hung | 114/345 |
| 5,006,087 A | * | 4/1991 | Peterson | 441/66 |
| 5,702,278 A | * | 12/1997 | Boucher | 709/243 |
| 5,713,773 A | * | 2/1998 | Churchill | 441/66 |
| 6,010,381 A | | 1/2000 | Peterson | |
| 6,257,943 B1 | * | 7/2001 | Peterson | 441/129 |
| 6,626,125 B1 | | 9/2003 | Klimenko | |
| 6,755,707 B1 | | 6/2004 | Klimenko | |
| D518,133 S | * | 3/2006 | Peterson | D21/770 |

FOREIGN PATENT DOCUMENTS

WO PCT/FR00/00478 2/2000

\* cited by examiner

*Primary Examiner*—Jesús D Sotelo
(74) *Attorney, Agent, or Firm*—Greenberg Traurig, LLP (57) ABSTRACT

An inflatable towable device capable of both being towed across a surface and to hover over the surface is disclosed. The device includes an inflatable frame and a wing surface that extends across the bottom surface of the inflatable frame. The inflatable frame is aerodynamically shaped to includes an elongated central section with seating surfaces for a rider that extends into wing sections that curve around to extend alongside the central section. The wing surface extends between the central section and the side wing sections to provide a lightweight wing structure that provides sufficient lift for the device when being towed to enable the device to hover above the surface for long distances.

19 Claims, 7 Drawing Sheets

FIG. 7

HOVERING INFLATABLE TOWABLE WATER-SPORT DEVICE

BACKGROUND

The invention generally relates to inflatable towable devices and, more particularly, to inflatable towable devices capable of hovering and techniques for their construction.

Inflatable devices for recreational water or snow use exist. One category of such devices, referred to as "personal watercraft (PWC)" or "towables," are designed to be towed behind a boat or other vehicle. These towable devices typically support one or more persons and include many designs ranging from tire inner tubes to more complex designs. The towable devices are designed to travel or skim across the surface of the water while occasionally bouncing off the surface when encountering a wave or in the water. When the towable devices are towed at higher speeds, the impact of the wave and wake bounces can be great.

Such impacts could be minimized by causing the inflatable towable device to lift off the surface of the water for extended distances, so as to hover over the water. However, some prior approaches only momentarily lifted the inflatable towable devices off of the surface of the water and did not maintain the devices in the air for extended distances. Still other prior approaches did not provide towable devices that were capable of being controlled in a stable, reliable manner by a user once the devices were lifted off of the water.

SUMMARY

The following is a summary of various aspects and advantages realizable according to various embodiments of the hovering inflatable towable water-sport device according to the present disclosure. It is provided as an introduction to assist those skilled in the art to more rapidly assimilate the detailed discussion of the device that ensues and does not and is not intended in any way to limit the scope of the claims that are appended hereto In one aspect, an inflatable towable device is provided that is capable of being towed across a surface as well as being capable of being towed to hover over the surface. The towable device includes an inflatable frame and a wing surface that extends across the bottom surface of the inflatable frame. The inflatable frame includes an elongated central section with seating surfaces for a rider that extends into wing sections curve around from the front of the central section to extend alongside the central section. The wing surface extends between the central section and the side wing sections to provide a lightweight wing structure that provides sufficient lift for the device when being towed to enable the device to hover above the surface for long distances.

In another aspect, the inflatable frame of the inflatable towable device is formed by encasing a inflatable chamber with a durable cover, the combination of which becomes a lightweight, rigid frame when inflated. The wing surface is further attached to the inflatable frame such that the wing surface is stretched tighter when the inflatable frame is inflated and expanded into its desired shape. This construction of large yet light surfaces that act as wings along with the aerodynamic shape of the device provide a degree of air lift to allow the device to become airborne at certain speeds and hover smoothly over a surface.

BRIEF DESCRIPTION OF THE DRAWINGS

By way of example, reference will now be made to the accompanying drawings.

DETAILED DESCRIPTION

With reference to FIGS. 1-6, an inflatable towable device 10 capable of hovering over a surface which the device 10 travels over in use is disclosed herein. While the device 10 is especially suitable for use as a water-sport device and will be described herein as being used on water, the construction and techniques of the device 10 are useful and applicable for other surfaces as well, such as snow, ice, land or other surfaces.

As shown, the device 10 includes an inflatable frame 12 and a wing surface 14. The inflatable frame 12 includes an inflatable elongated central section 16 and a pair of inflatable wing sections 18. The wing sections 18 extend away from a front portion 20 of the central section 16 in a curvilinear manner so as to curve around until the end portions 22 of the wing sections 18 extend in a direction alongside the elongated direction of the central section 16. With this configuration, the inflatable frame 12 becomes substantially "epsilon-shaped" when inflated. The inflatable frame 12 also includes a aerodynamically-shaped front nose 24 that is designed to displace air similar to that of an airplane nose. The wing surface 14 is attached to the bottom surface of the inflatable frame 12 so as to extend between the central section 16 and the wing sections 18 of the inflatable frame 12.

Figure 7:
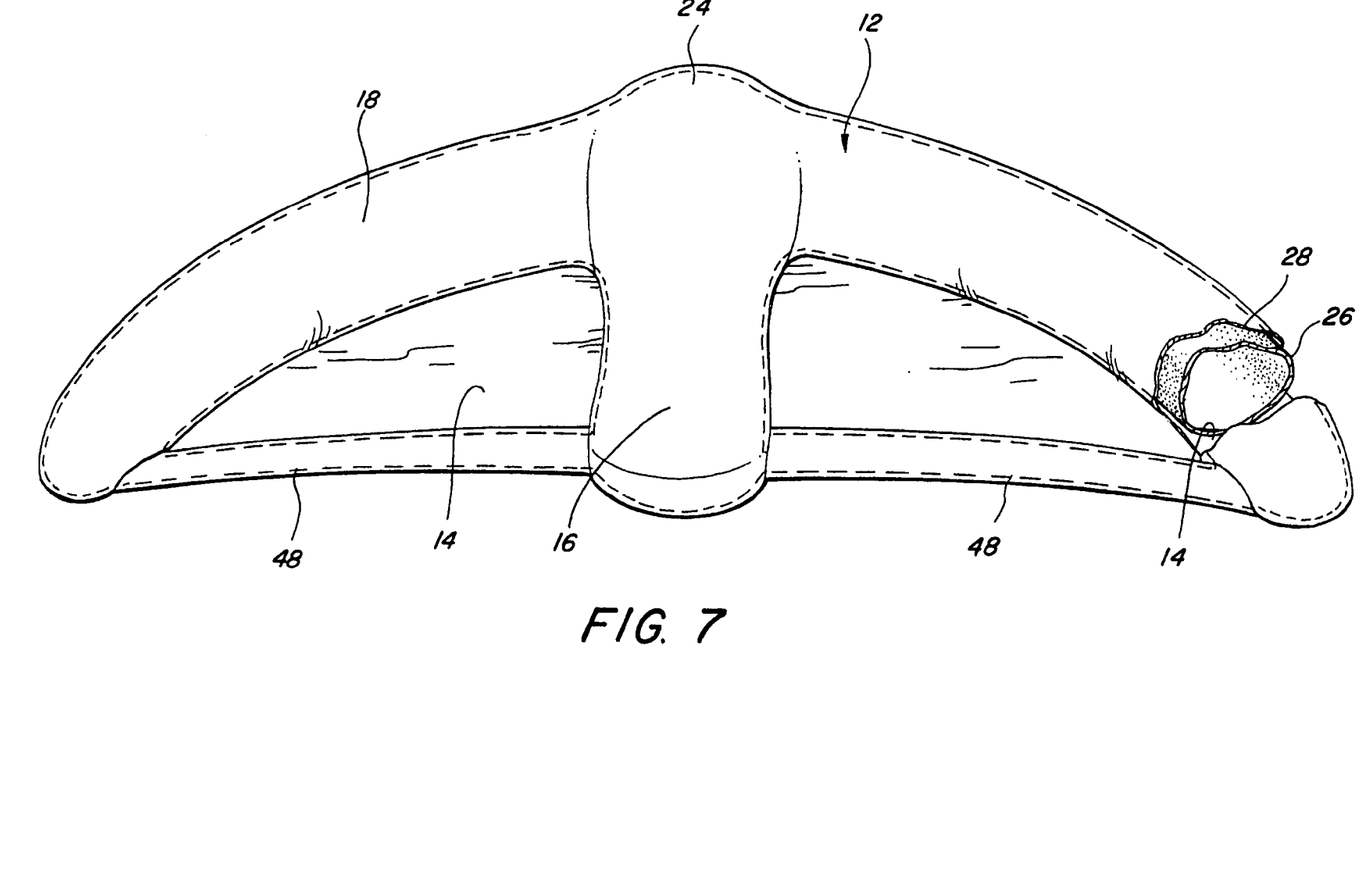
FIG. 7 illustrates a partial cut-away rear view of a hovering inflatable towable water-sport device.

The inflatable frame 12 includes an inner inflatable bladder or chamber 26 encased within an outer cover 28, as shown in FIG. 7. In one embodiment, the inflatable chamber 26 is made of plastic material substantially impervious to passage of an inflation fluid, such as polyvinylchloride (PVC), and is typically inflatable with air or other appropriate fluid through a valve (not shown). While PVC is a preferred choice of material from which the inflatable chamber 26 is formed, those skilled in the art will recognize that other fluid-impervious materials may also be used, such as but not limited to polyester, EVA or other weldable or gluable plastic materials. Furthermore, although only one inflation chamber 26 is shown in the figures, the center section 16 and wing sections 18 of the inflatable frame 12 may include separately inflatable sections.

The cover 28 positioned around the inflatable chamber 26 is preferably formed of flexible, heavy-duty material, such as (but not necessarily limited to) polyester, nylon, tarpaulin, fabric reinforced PVC materials or cotton or other sewn material blends, designed to withstand substantial frictional-contact wear. Those skilled in the art will recognize that other similar wear-resistant materials may be used for the cover 28. The cover 28 surrounds and encases the inflatable chamber 26, principally to protect the material of inflatable chamber 26 in use from undesired contact with the ground or other surfaces and to enhance the overall rigidity of device 10. In one embodiment, the cover 28 includes a liftable flap 30 for providing access to an inflation valve connected to the inflatable chamber 26 while covering and protecting the inflation valve when closed.

During assembly of the device 10, the cover 28 includes an opening for the insertion of the inflatable chamber 26. After insertion, the opening in the cover 28 is sealed to enclose the inflatable chamber 26 by sewing, welding, gluing or otherwise attaching the cover 28 to itself to close the opening. In one embodiment, the inflatable chamber 26 is not permanently attached to the cover 28 but is merely inserted within correspondingly-shaped portions of the cover 28, such that inflation of the inflatable chamber 26 causes the inflatable chamber 26 to expand and engage the inner surface of the cover 28. In another embodiment, the inflatable chamber 26 may be at least partially attached to the inside of the cover 28 by sewing, welding, gluing, using an intermediate material or otherwise attaching the components together. In yet another embodiment, the cover 28 may include a reclosable opening that allows access to the inflatable chamber 26 to repair or replace the inflatable chamber 26.

The wing surface 14 is preferably formed of a layer of material that extends across the bottom surface of the inflatable frame 12 and forms the bottom surface of the device 10. Thus, the wing surface 14 is formed of a heavy-duty material designed to withstand substantial frictional-contact wear imparted by the surface on which the device is used, where the wing surface 14 may be formed of polyester, nylon, tarpaulin, fabric reinforced PVC material, cotton or other sewn material blends or other similar wear-resistant materials. The wing surface 14 extends between the elongated central section 16 and the wing sections 18 of the inflatable frame 12 so as to essentially form two wings extending in both directions of the elongated central section 16. As such, the wing surface 14 may be formed of a single, continuous layer of material that extends across the entire bottom surface of the device 10 or may alternatively be formed of separate pieces of material that are each positioned to extend between the central section 16 and a respective one of the wing sections 18. The wing surface 14 is attached to the bottom surface of the cover 28 by sewing, welding, gluing or otherwise attaching the components together. During inflation of the inflatable chamber 26 which causes the inflatable frame 12 to possess its desired shape, the wing surface 14 will be pulled tighter or stretched as the wing sections 18 take shape and move apart from the central section 16.

Once inflated, the inflatable frame 12 provides the device 10 with a desired level of buoyancy that allows the device to be towed across water while the wing surface 14 provides the device 10 with a desired level of air lift to enable the device 10 to hover over water when certain conditions for lift-off are met. In this manner, the device 10 can be towed across the surface of the water or, alternatively, to hover over the surface of the water.

Figure 1:
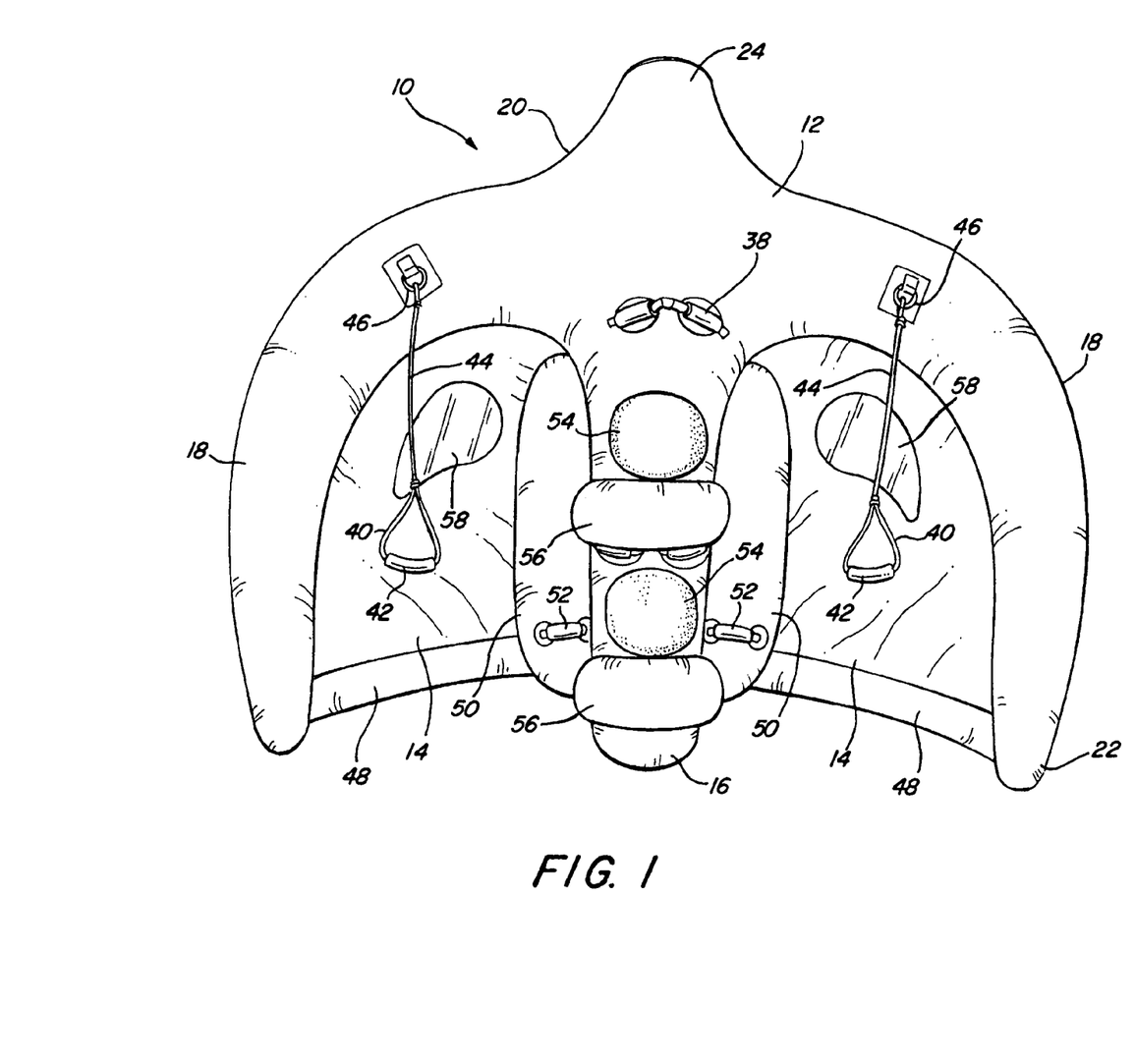
FIG. 1 illustrates a top view of a hovering inflatable towable water-sport device.
Figure 2:
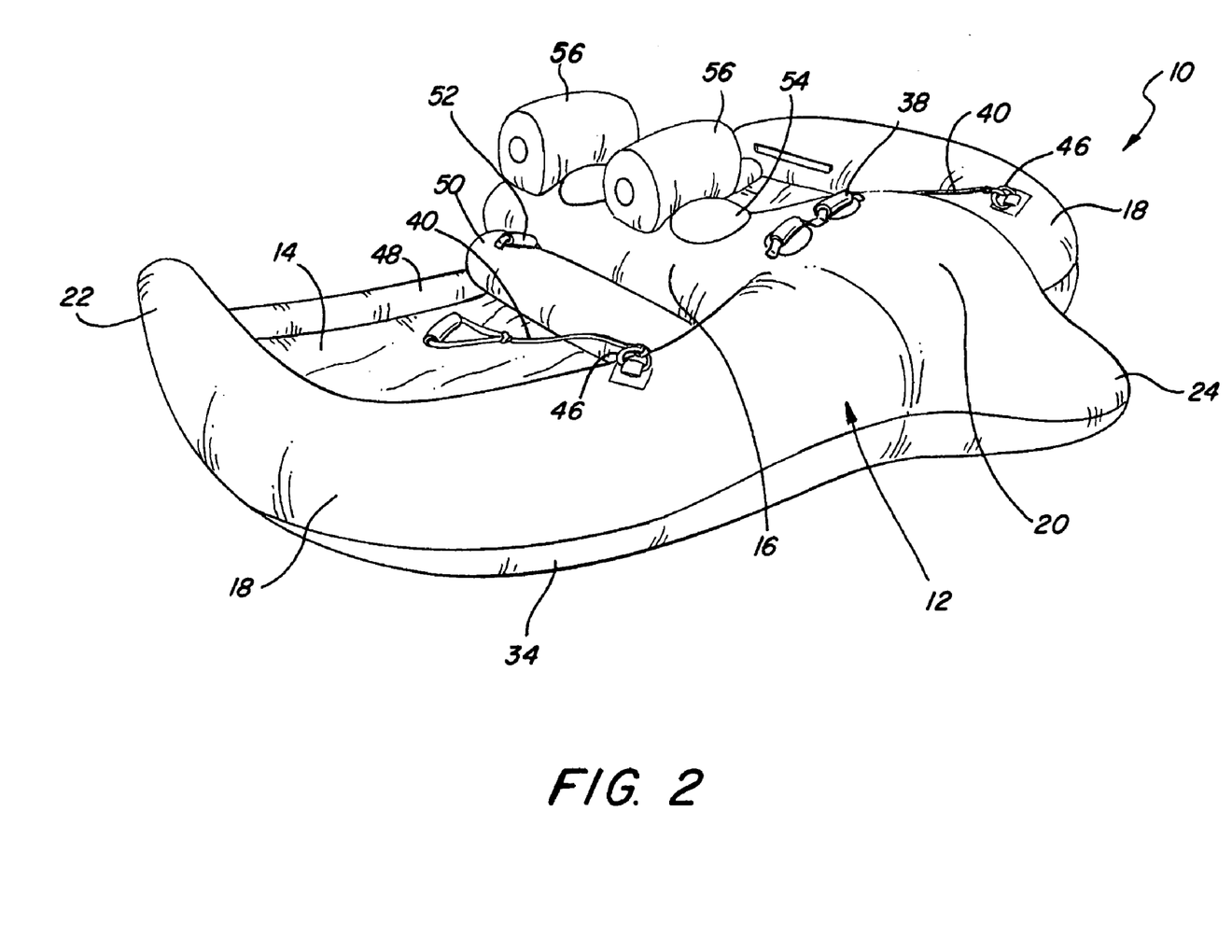
FIG. 2 illustrates a perspective view of a hovering inflatable towable water-sport device.
Figure 3:
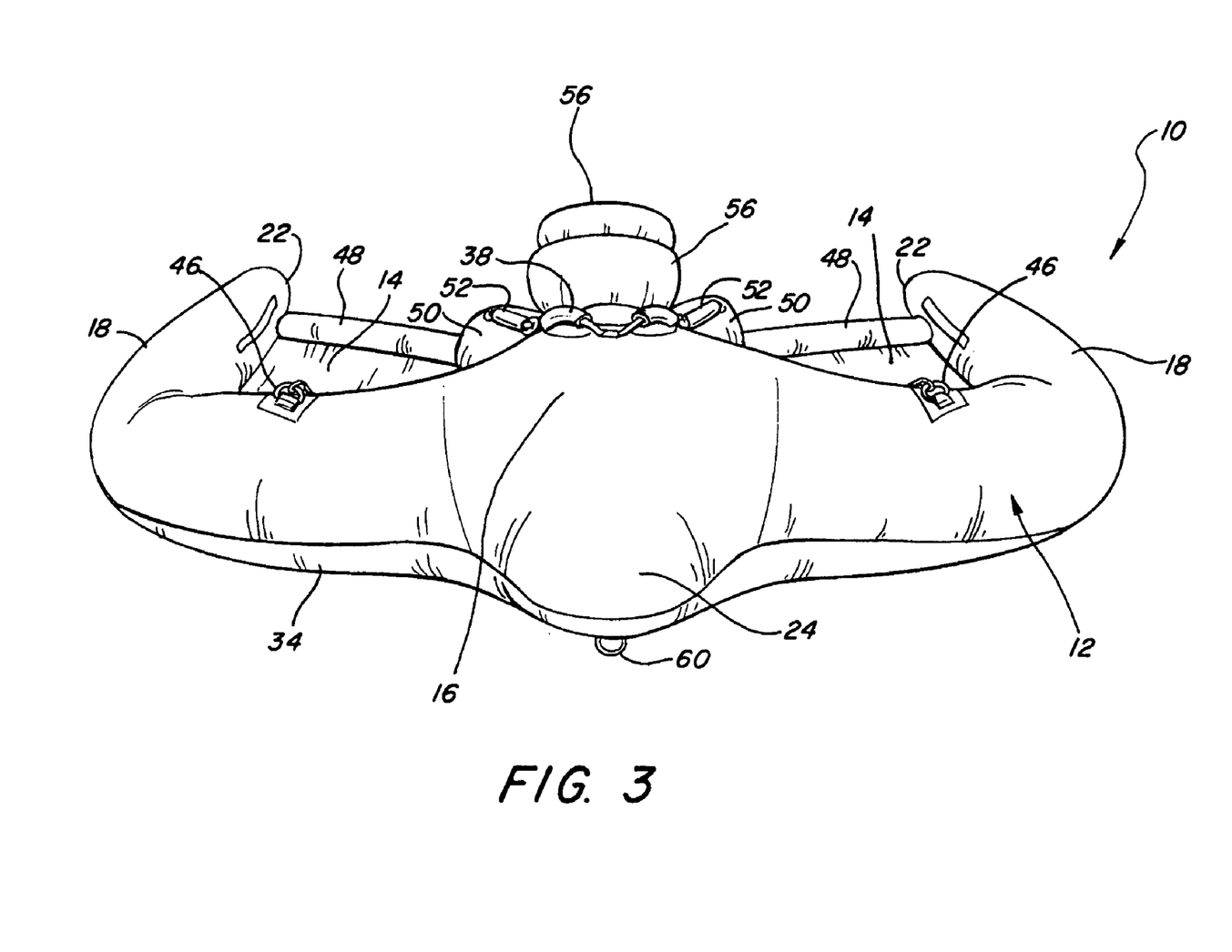
FIG. 3 illustrates a front view of a hovering inflatable towable water-sport device.
Figure 4:
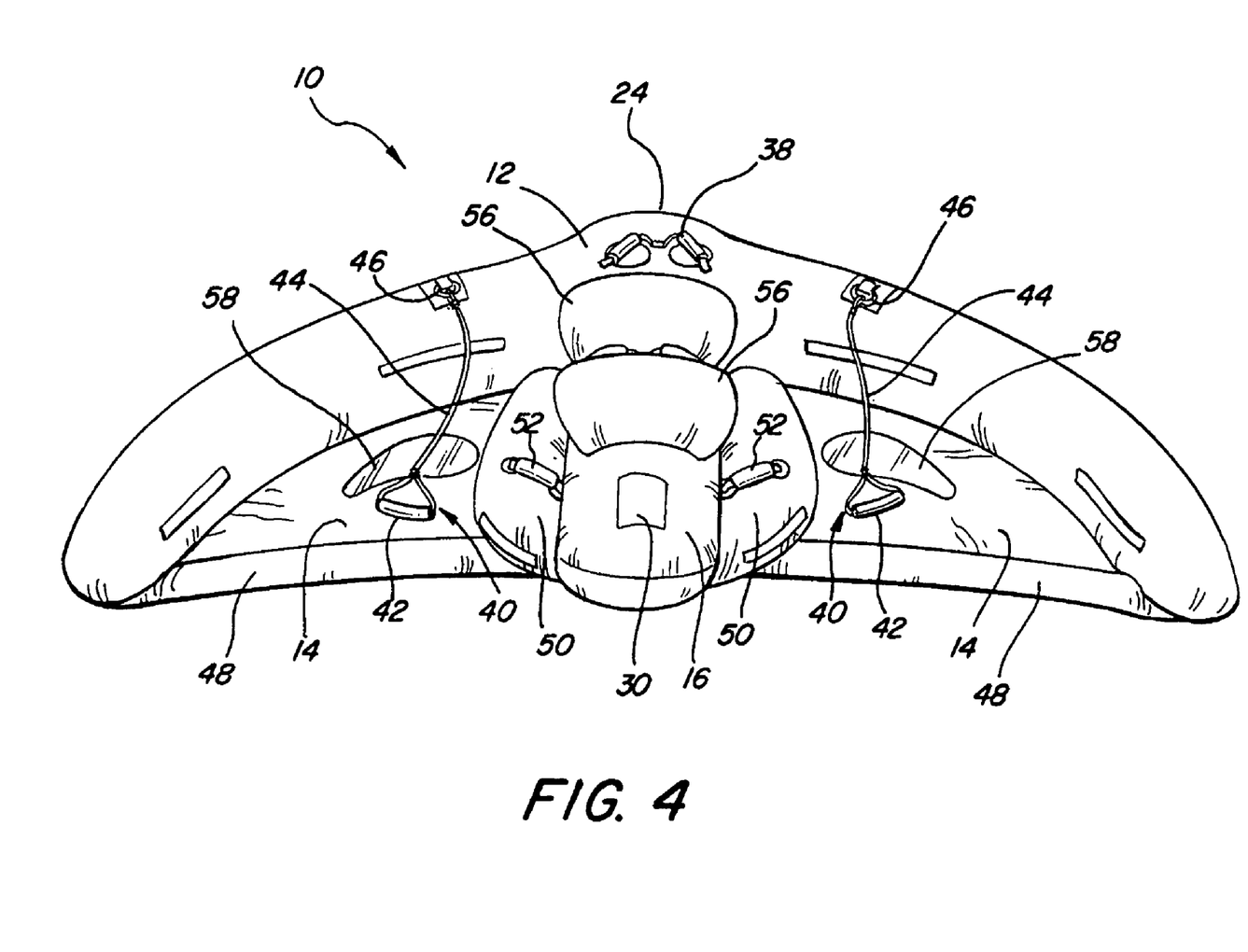
FIG. 4 illustrates a rear view of a hovering inflatable towable water-sport device.
Figure 5:
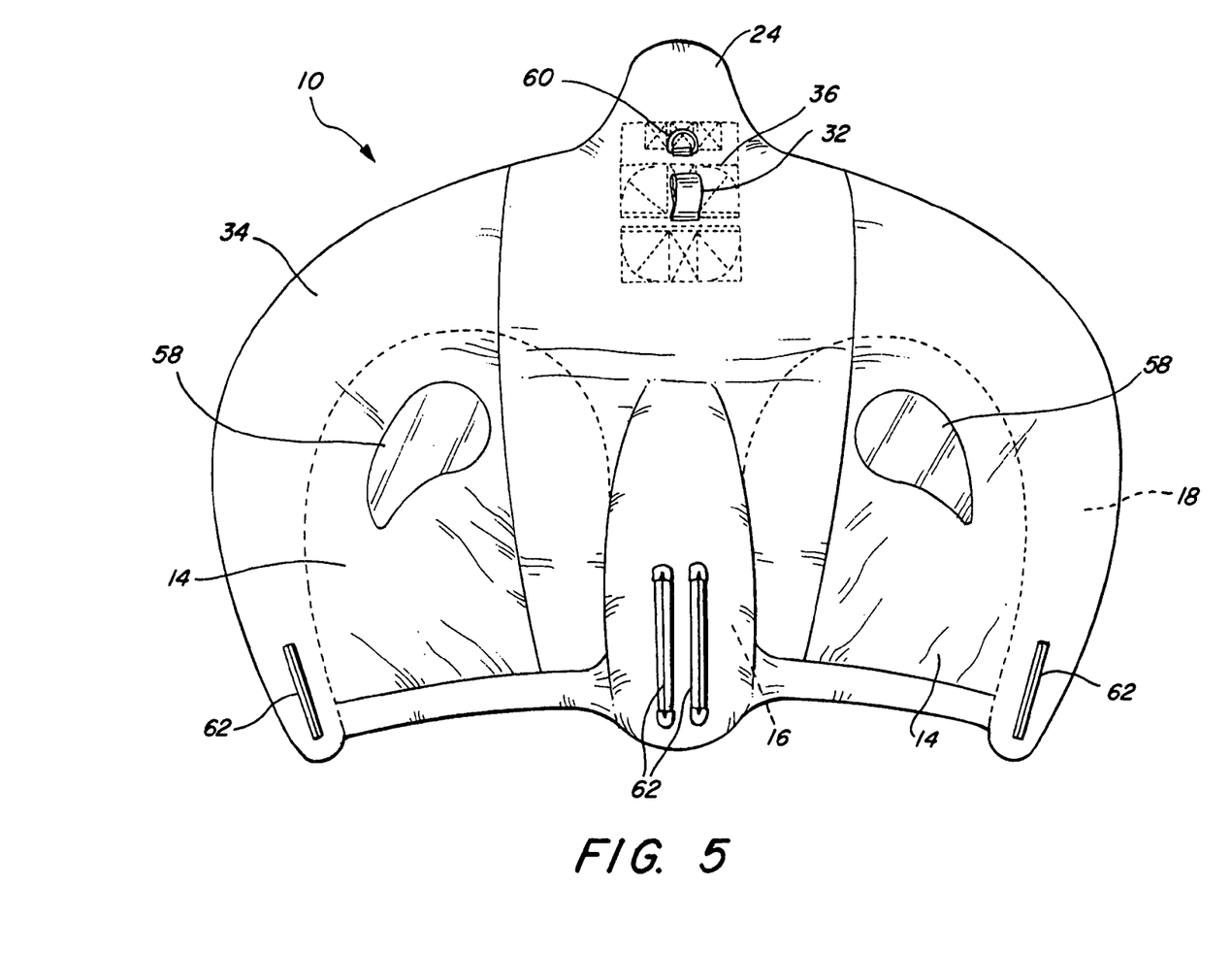
FIG. 5 illustrates a bottom view of a hovering inflatable towable water-sport device.
Figure 6:
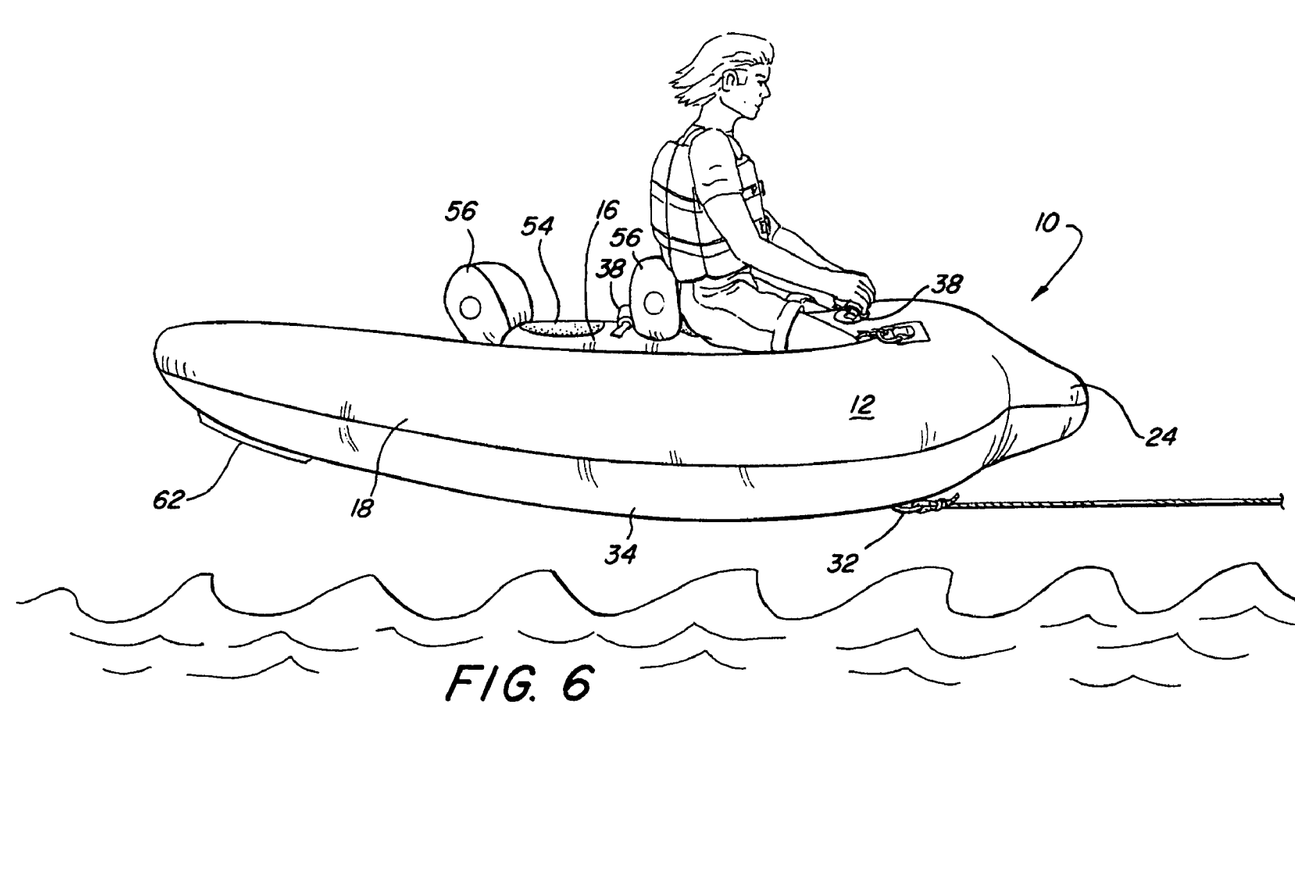
FIG. 6 illustrates a side view of a hovering inflatable towable water-sport device while hovering over water.

With reference to FIGS. 5 and 6, the inflatable towable device 10 includes a tow harness 32 positioned on its bottom surface 34 that allows a tow rope to attach the device 10 to a vehicle, such as a boat. The tow harness 32 may include a looped webbing strap, a ring, or other similar attachment point on the bottom surface 34 of the device 10 having an opening that allows a rope to be attached thereto. In one embodiment, the tow harness 32 includes a looped webbing strap that is sewn or otherwise attached to a harness reinforcement area 36 on the bottom surface of the device 10, where the looped webbing strap extends out of the device 10 to allow for attachment by a rope. The strap of the tow harness 32 extends through the bottom surface 34 of the device 10 (which may be the wing surface 14 or the cover 28, depending upon the particular configuration of the device 10) where the strap is reinforced with additional webbing straps crossing over it in the harness reinforcement area 36 to distribute the tow forces acting on the tow harness 32 over a larger area surrounding the harness reinforcement area 36. By distributing the tow forces over a larger area, a more reliable connection to the device 10 is provided that will reduce the possibility of separation of the tow harness 32 from the device 10 during operation. The distributed tow forces across a larger area will also help to resist against rotation when the device 10 is hovering above the surface of the water to provide a more stable ride.

In one embodiment, a plurality of hand grips or handles 38 are attached to the inflatable frame 12 to allow a rider to hold onto the device 10 during operation. The handles 38 are positioned at locations adjacent to where a rider or riders would be situated on the device 10. The handles 38 are also positioned in front of the rider to allow the rider to pull on the handles 38 to assist in lifting the nose 24 of the device 10 out of the water and into the air while being towed to begin hovering operation. In one embodiment, one or more rope handles 40 may further be attached to the inflatable frame 12 comprising a handle grip 42 formed on the end of a piece of rope 44 that is attached to a ring 46 or other attachment point connected to the inflatable frame 12. The rope handles 40 provide the rider with even greater leverage and control for lifting the nose 24 of the device 10 in the air.

During operation, a rider sits or lays on the elongated center section 16 of the inflatable frame 12 while the device 10 is towed behind a boat. When the device 10 reaches a sufficient speed, the conditions may allow for the device 10 to be pulled up into the air so that the device 10 will hover over the surface. Initially, the rider will pull up either handles 38 or rope handles 40 to help lift the nose 24 of the device 10 off of the surface. By providing the tow harness 32 on the bottom surface of the device 10 instead of the utmost front portion of the device 10, the tow forces pulling on the bottom surface of the device 10 will further assist the nose 24 of the device 10 into the air by pulling the tow harness 32 toward the boat. The nose 24 and curvilinear wing sections 18 are aerodynamically shaped to minimizing the amount of drag encountered while further displacing air above and below the device 10 to create a desired pressure differential to provide a desired lift. The inflatable frame 12 is shaped to possess an increasing width from the parabolic-shaped nose 24 to the wing sections 18, as shown in the figures, to minimize drag will still providing a wide enough wing structure that provides for stable hovering with less tendency to flip or turn. Inflatable frames that are more V-shaped from the nose to the wing sections were not found to provide sufficient stability, where the present D-shape from the nose 24 to the wing sections 18 provided easier lift off, longer airborne hovering times and a more stable ride with less tendency to flip or turn by properly balancing drag and lift of the device 10.

The wing surface 14 extending between the central section 16 and the wing sections 18 will act as wings and provide lift for the device 10. Once lifted in the air, the device 10 may then hover above the surface for as long as the speed at which the device 10 is towed is maintained. A rider may further use the handles 38 or rope handles 40 to help control the device 10 within the air. The particular speed required to obtain and maintain lift and the hovering height will vary according to numerous factors, including but not limited to the weight of the riders and the device 10, the surface area of the device 10, the surface conditions, wind conditions, etc.

In one embodiment, the device 10 includes wing reinforcement cross-tubes 48 extending between the wing sections 18 and the central section 16 to provide added stability for the wing sections 18 and prevent the wing sections 18 and the wing surface 14 from bending or folding when the device 10 is being towed, especially when the device 10 is lifted in the air. The cross-tubes 48 are preferably inflatable PVC tubes that are positioned within channels formed in the rear-most portion of the wing surfaces 14, where the cross-tubes 48 are inflated until they provide a sufficient rigidity. However, it is should be recognized by those skilled in the art that other types of inflatable materials or non-inflatable rigid materials may used to stabilize the wing sections 18 to the central section 16, where it is also understood that the cross-tubes 48 can be positioned at other locations on the wing surface 14 between the wing sections 18 and the center section 16 or at multiple locations. As described above, the wing surface 14 is preferably formed as a layer of wear-resistant material to keep the device 10 as light as possible and enable the device 10 to hover above a surface, such that the cross-tubes 48 are utilized to stabilize the wing surface 14 and prevent its bending or folding. However, in alternative embodiments, it possible to form wing surfaces 14 entirely as inflatable chambers extending between the central section 12 and the wing sections 16 to provide such wing stabilization.

In one embodiment, the inflatable central section 12 further includes seating areas 54 for one or more riders. The seating areas 54 are preferably soft neoprene surfaces that are attached to the cover 28, such as by stitching, gluing or other attachment methods. However, it is understood to those skilled in the art that other materials that provide a comfortable and durable seating surface can be used for seating areas 54. To provide additional comfort and support for a rider, in one embodiment, inflatable backrests 56 may be attached to the inflatable center section 12 behind each of the seating areas 54. The inflatable backrests 56 provide back support to a rider if seated and further provide leg support to a rider if standing on the device 10. To provide for both back support and leg support, the inflatable backrests 56 should have a width that slightly extends beyond the width of the inflatable center section 12. The inflatable backrests 56 are formed of PVC or other similar inflatable material and may be attached to the upper surface of the inflatable center section 12 using attachment methods described herein or may alternatively be formed to be integral with the inflatable center section 12.

In one embodiment, the device 10 may include inflatable footrest tubes 50 positioned adjacent to both sides of the inflatable center section 12 to support the feet of a rider. The footrest tubes 50 provide a comfortable location for the rider to rest his feet as well as providing a degree of cushioning for the rider's feet during use. The footrest tubes 50 are formed of PVC or other similar inflatable material and may be attached to the side surfaces of the inflatable center section 12 using attachment methods described herein or may alternatively be positioned within channels formed in either the cover 28 or the wing surface 14. In one embodiment, the footrest tubes 50 may further include foot straps 52 that allow a rider's feet to be inserted therein to more securely attach the rider to the device 10 and help maintain contact between the rider and the device 10 when the device 10 lifts off of the water and hovers. The foot straps 52 include soft padding for comfort of the rider's foot, such as soft EVA tubing positioned around a strap or short tube. The foot straps 52 can be used whether the rider is sitting or laying on top of the inflatable central section 12.

In one embodiment, the wing surface 14 includes at least one transparent window 58 that allows a rider to see through the wing surface 14 to the other side of the device 10. During lift off, the nose 24 of the device 10 is initially lifted off of the traveling surface and the device 10 will be towed at an angle. Further, when hovering, the device 10 may be towed in the air at an angle such that the inflatable frame 12 may obstruct part of the forward view of the rider. The window 58 is useful in allowing a rider to see through the wing surface 14 to the front of the device 10 when the device 10 is being towed at such an angle. Further, the window 58 allows a rider to view the surface on which the device 10 is towed. The window 58 is formed of a transparent plastic material, such as PVC or other similar material, that is attached to an opening formed in the wing surface 14 through attachment methods described herein. In an alternative embodiment, the entire wing surface 14 may formed of a transparent material.

In one embodiment, the inflatable towable device 10 further includes an adjustable tow point that allows a rider to select the particular towing and hovering characteristics of the device 10. To provide an adjustable tow point, an additional attachment point 60 is provided on the bottom surface of the device 10 in front of the tow harness 32. The tow rope that attaches to the tow harness 32 can be arranged to pass through the additional attachment point 60 that is located closer to the nose 24 of the device 10, thereby exerting a force pulling the nose 24 downward toward the water and making it more difficult for the device 10 to become airborne. The additional attachment point 60 may be formed as a rigid ring, a fabric loop or other device having an opening attached to the bottom surface of the device 10 that allows the tow rope to pass there through to the tow harness 32. In an alternative embodiment, multiple attachment points 60 can be provided in front of the tow harness 32 to provide multiple different selectable towing and hovering characteristics for the device 10. In this manner, riders that want to ride the device 10 on water but do not want to hover can insert the tow rope through an attachment point 60 closer to the nose 10 of the device to keep the nose 24 of the device 10 on the water. Riders that prefer the hovering mode of the device 10 can chose not to use the additional attachment point 60 and attach the tow rope directly to the tow harness 32, such that the device 10 can be operated to hover as described herein.

In one embodiment, as shown in FIG. 6, directional strakes or fins 62 may be attached to the bottom surface 34 of the device 10 to provide directional stability when the device 10 is being towed on water. During lift off of the device 10 into its hovering mode, the nose 24 of the device will initially lift out of the water while the rear portion of the device 10 will still remain in the water. At this point, the directional fins 62 assist in maintaining the forward direction or path of the device 10 to allow proper air lift out of the water to occur. The directional fins 62 are preferably formed under the areas of the device 10 possessing the most contact with the water in order to reinforce such heavy contact areas and reduce the stress applied to the wing surface 14 or cover 28. In one embodiment, the fins 62 are formed of a soft plastic material, such as PVC or other similar material, that is attached to a PVC coated fabric that is, in turn, sewn to the bottom surface 34 of the device 10. It should be recognized to those skilled in the art that other types of materials can be used to form the fins 62 and that other types of attachment methods can be utilized to attach the fins 62 to the device.

While the above description contains many specific embodiments, these should not be construed as limitations on the scope of the disclosure, but rather as an exemplification of preferred embodiments thereof. The separate aspects of each embodiment described herein may be combined with the other embodiments described herein. Those skilled in the art will appreciate that various adaptations and modifications of the just described embodiments can be configured. Therefore, it is to be understood that, within the scope of the appended claims, different embodiments may be practiced other than as specifically described herein.

The invention claimed is:

1. An inflatable towable device comprising:
   an inner inflatable chamber;
   a protective cover positioned around said inflatable chamber;
   a wing surface attached to a bottom surface of said cover to provide a degree of air lift for the device, wherein the wing surface provides a degree of air lift for the device while the device is being towed over a surface so as to enable the device to hover over the surface; and
   flight stabilization directional strakes attached to a rear portion of a bottom surface of the device for maintaining a direction of the device being towed during lift off of the device from the surface as the device transitions to a hovering state.

2. The inflatable towable device of claim 1, wherein said inner inflatable chamber includes an elongated center section and two side wing sections.

3. The inflatable towable device of claim 2, wherein said wing surface extends between said center section and said wing sections of said inflatable chamber.

4. The inflatable towable device of claim 1, wherein said inflatable chamber is formed from a PVC material.

5. The inflatable towable device of claim 1, wherein said cover is formed from at least one of nylon, polyester and tarpaulin.

6. The inflatable towable device of claim 1, wherein said wing surface is a layer of material formed from at least one of nylon, polyester and tarpaulin.

7. The inflatable towable device of claim 1, wherein said wing surface is stretched to a desired tightness when said inflatable chamber is inflated.

8. An inflatable towable device comprising:
   an inflatable frame having inflatable sections that extend around an entire periphery of the device; and
   a wing surface extending between said inflatable sections of said inflatable frame to provide a degree of air lift for the device;
   wherein the inflatable sections include an elongated center section, a pair of side wing sections, and rear reinforcement sections extending between said center section and respective side wing sections, and
   wherein said inflatable frame further includes an inflatable nose section, wherein said inflatable frame increases in width as said inflatable frame moves from said nose to end portions of said side wing sections.

9. The inflatable towable device of claim 8, wherein said inflatable frame further includes a parabolic-shaped nose.

10. The inflatable towable device of claim 8, wherein at least one of said inflatable sections are separately inflatable from the other of said inflatable sections.

11. The inflatable towable device of claim 8, wherein said elongated center section and said side wing sections are formed as a single inflatable chamber with said side wing sections extending in a curvilinear manner away from a front portion of said center elongated section.

12. The inflatable towable device of claim 8, further comprising a tow connection on a bottom surface of the device that allows the device to be towed.

13. The inflatable towable device of claim 8, further comprising multiple selectable tow connections that allow the device to be towed according to a plurality of possible tow characteristics, where the tow characteristics of the device can be variably selected according to a particular tow connection selected.

14. The inflatable towable device of claim 8, further comprising at least one fin attached to a bottom surface of the device.

15. The inflatable towable device of claim 8, wherein said wing surface includes at least one transparent window.

16. The inflatable towable device of claim 8, further comprising a tow connection on a bottom surface of the device positioned to assist in initiating flight of the device into a hovering state while the device is being towed and to assist in maintaining the device in a hovering state.

17. The inflatable towable device of claim 8, further comprising multiple selectable tow connections that allow the device to be towed according to a plurality of possible tow characteristics, where the tow characteristics include a hovering state in which the device hovers over a surface and a non-hovering state in which the device is prevented from hovering over a surface.

18. An inflatable towable device comprising:
   an inflatable frame having inflatable sections that extend around an entire periphery of the device;
   a wing surface extending between said inflatable sections of said inflatable frame to provide a degree of air lift for the device,
   wherein the inflatable sections include an elongated center section, a pair of side wing sections, and rear reinforcement sections extending between said center section and respective side wing sections;
   further comprising inflatable footrests positioned adjacent to said elongated center section.

19. An inflatable towable device comprising:
   an inflatable frame having inflatable sections that extend around an entire periphery of the device; and
   a wing surface extending between said inflatable sections of said inflatable frame to provide a degree of air lift for the device;
   wherein the inflatable sections include an elongated center section, a pair of side wing sections, rear reinforcement sections extending between said center section and respective side wing sections,
   further comprising a seating area on said elongated center section and an inflatable back rest attached to said elongated center section adjacent to said seating area.

* * * * *